United States Patent
Sygnator

[15] 3,705,442
[45] Dec. 12, 1972

[54] SNAP-IN FASTENER
[72] Inventor: Harry A. Sygnator, Arlington Heights, Ill.
[73] Assignee: Illinois Tool Works, Inc., Chicago, Ill.
[22] Filed: Oct. 6, 1971
[21] Appl. No.: 187,016

[52] U.S. Cl. ..........................................24/73 P, 85/5
[51] Int. Cl. ..............................................A44b 21/00
[58] Field of Search..............16/2; 85/80, 5, DIG. 2; 24/73 B, 73 R, 73 MF, 73 FT, 73 HS, 73 PF, 73 P, 73 Q, 73 AP, 73 PM

[56] References Cited
UNITED STATES PATENTS

| | | | |
|---|---|---|---|
| 1,968,168 | 7/1934 | Place | 24/213 B UX |
| 2,584,812 | 2/1952 | Poupitch | 85/5 R |
| 2,620,537 | 12/1952 | Gobin-Daude | 24/213 R |
| 2,956,605 | 10/1960 | Rapata | 85/80 |
| 3,568,263 | 3/1971 | Meehan | 24/73 P |

Primary Examiner—Donald A. Griffin
Attorney—Jack R. Halvorsen et al.

[57] ABSTRACT

This invention relates generally to improvements in spring type fasteners and more particularly to a one-piece fastener for attaching and detaching the back panel of a television set with respect to the chassis thereof. An embodiment of the invention disclosed herein comprises a pair of elongate, blade-like members resiliently coupled at one extremity to a snap-in head having a clamping surface for engaging one side of an apertured workpiece or panel. Said blade-like members are movable in scissors-like fashion and are provided with oppositely disposed shoulders for engaging the opposite side of said apertured workpiece. Said members may be temporarily retained in panel disengaged relation against the opposing force of said resilient coupling to facilitate attachment or detachment of a back panel with respect to a television chassis.

10 Claims, 8 Drawing Figures

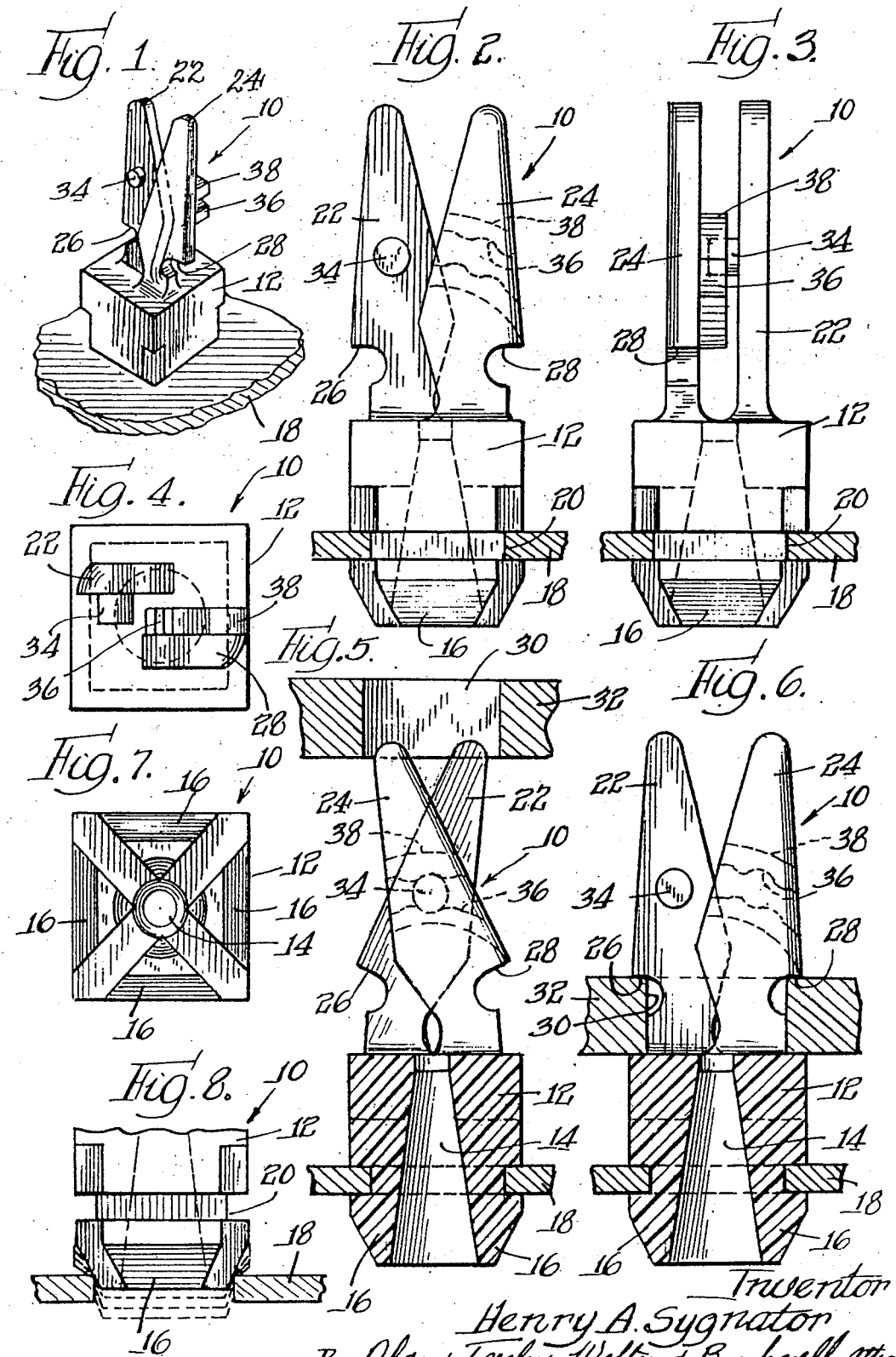

SNAP-IN FASTENER

SUMMARY OF THE INVENTION

Present day television sets are usually equipped with a detachable back panel. The present invention contemplates a spring-type fastener which may be advantageously employed to facilitate the association and disassociation of a T.V. back panel with respect to the chassis thereof. To this end the present invention envisions a novel and practical spring fastener equipped with panel engaging shoulders which may be temporarily maintained in panel disengaging position to facilitate the simultaneous telescopic association or disassociation of a plurality of panel apertures with respect to a plurality of complementary fixedly mounted spring fasteners.

It is also important that fasteners employed to secure the back panel of a T.V. set upon a chassis be electrically nonconductive, and to this end the present invention contemplates a panel fastener comprising a one-piece molded plastic device.

Still more specifically, the present invention contemplates a one-piece molded plastic fastener element of unique construction having locking means manually collapsible to facilitate association or disassociation with respect to an apertured panel.

It is a further object of the present invention to provide novel and practical means for temporarily maintaining the above-mentioned fastening means in collapsed condition to facilitate application or detachment of an apertured panel, as for example, the back panel of a T.V. set, with respect to the chassis thereof.

BRIEF DESCRIPTION OF THE DRAWING

The foregoing and other objects and advantages will be more apparent from the following detailed description when considered in connection with the accompanying drawing wherein FIG. 1 is a perspective view of a spring fastener which is representative of one embodiment of the present invention, the head section of the fastener being fixedly mounted upon an apertured panel;

FIG. 2 is an enlarged elevational view of the device shown in FIG. 1;

FIG. 3 is an elevational view of the fastener shown in FIGS. 1 and 2, said view being taken from the right of FIG. 2;

FIG. 4 is a plan view of the fastener illustrated in FIG. 2;

FIG. 5 is a view similar to FIG. 2 disclosing the locking arms in collapsed relation in readiness for accommodating a complemental aperture of a workpiece or panel member;

FIG. 6 is a view similar to FIG. 5 disclosing the fastener after it has been telescopically associated with the panel aperture and locked in place;

FIG. 7 is an end view of the bottom or entering extremity of the fastener illustrated in FIGS. 1 to 6, inclusive; and FIG. 8 is a fragmentary elevational view of the lower or head extremity of the fastener to illustrate the manner in which said head may be snapped into locking engagement with an apertured panel member.

DESCRIPTION OF A PREFERRED EMBODIMENT

Referring now to the drawing more in detail, wherein like numerals have been employed to designate similar parts, throughout the various figures, it will be seen that a spring fastener which is representative of one embodiment of the present invention is designated generally by the numeral 10. The fastener 10 includes a head 12 having a central longitudinal aperture 14 surrounded by laterally yieldable or collapsible sections 16. Thus, as the head 12 is telescopically associated with a complementary aperture in a panel 18, as illustrated in FIG. 8, said section 16 will yield to thereby permit interlocking association of a recess 20 with said panel. The panel 18 represents the sheet metal chassis of a television set.

Formed integral with and extending axially of the fastener head 12 are elongate laterally spaced members or blades 22 and 24. Because of the inherent resiliency or yieldability of the plastic material used in the fabrication of the fastener 10, the blades 22 and 24 present a yieldable coupling with the trailing extremity of the head 12. The elongate members 22 and 24 normally occupy the position illustrated in FIGS. 1 and 2. Each of the members 22 and 24 is notched to provide work-clamping shoulders 26 and 28, respectively. By manually engaging the outer extremities 22 and 24 and exerting a clamping pressure, said scissors-like members or blades may be shifted from the position of FIG. 2 to the position illustrated in FIG. 5. In this latter position, an aperture 30 of a panel 32 may be telescopically associated with or disassociated from said blades.

The back panel of a television set may be provided with a plurality of spaced apertures 30, each being located in a position to accommodate a complementary fastener mounted on the chassis panel 18. Therefore, in order to condition each of the fasteners for telescopic association with or disassociation from said apertures, it is essential that means be provided for temporarily maintaining the blades 22 and 24 in the crisscrossed relation as illustrated in FIG. 5. Thus, as the locking arms 22 and 24 are manually shifted from the position shown in FIGS. 2 and 6 to the position illustrated in FIG. 5, a lug 34 formed integral with and extending laterally of the member 22 and a recess 36 in a lug 38 formed integral with and extending laterally of the elongate member 24 are moved into interlocking association. The shifting of the elongate members 22 and 24 to this position is yieldably resisted by the above mentioned resilient coupling thereof with the trailing extremity of the head 12. After complete telescopic association of the apertured panel 32, the members 22 and 24 may be readily unlocked from each other by urging them radially outwardly, thereby enabling the inherent resiliency of the aforesaid coupling to urge the shoulders 26 and 28 into firm clamping engagement with the surface area of the panel 32 defining the apertures 30 as clearly illustrated in FIG. 6.

It will be understood, from the foregoing that before the apertures 30 of the back panel member 32 are telescopically associated with the fasteners 10, each of said fasteners are first conditioned so that the scissors-like blades 22, 24 thereof are conditioned to occupy and be temporarily held in the position illustrated in FIG. 5. The apertures 30 of the panel 32 may then be contemporaneously associated with their respective fasteners.

By a simple outward shifting of the elongate members 22 and 24 from their interlocked relation, the shoulders 26 and 28 are brought into firm clamping engagement with the outer surface of the back panel. Likewise, to remove the panel, it is only necessary to press the elongate members 22 and 24 toward each other sufficiently to establish the above described interlock of the lug 34 with the notched recess 36 of the lug 38. It will be apparent from the foregoing that a back panel of a television set may be applied or detached as a unit without the time-consuming and inconvenient use of conventional screws and the like which has heretofore been experienced.

It is important that fasteners used for the purpose of securing parts such as panel members in association with electronic equipment such as television sets be electrically nonconductive. Plastic molded spring fasteners of the type contemplated by the present invention are electrically non-conductive and may be conditioned for panel attachment or detachment without the potential hazard of physical contact with electrically conductive elements. The elongate construction of the scissors-like blades greatly facilitates the ease with which said members may be shifted into or out of locking engagement.

It will also be apparent from the foregoing that the present invention contemplates a spring-type fastener of simple one-piece construction which may be produced readily by the practice of conventional plastic molding methods.

While the fastener of the present invention has been described for use in association with panels of electronic equipment such as television sets, it will be understood that such fasteners may be used with equal facility for securing a wide variety of apertured sheets or panel members.

The invention is claimed as follows:

1. An elongate one-piece spring type fastener including a head at one extremity for attachment to an apertured support, said head having a clamping surface for engaging one side of an apertured panel, a plurality of elongate, blade-like members, at least one of which is resiliently coupled at one extremity with said head in the vicinity of the clamping surface thereof, said members being disposed in crisscross relation and relatively shiftable to permit telescopic association and disassociation therewith with respect to a complementary panel aperture, a pair of oppositely disposed shoulders on said members for lockingly engaging the opposite side of said apertured panel, said resilient coupling serving to yieldably maintain the shoulders of said members in panel-engaging relation, and means for temporarily retaining said members in panel-disengaging relation whereby to facilitate telescopic association with and disassociation from a complementary panel aperture.

2. An elongate one-piece spring type fastener as set forth in claim 1, wherein all of said blade-like members are resiliently coupled at one extremity with said head.

3. An elongate one-piece spring type fastener as set forth in claim 1 wherein the head thereof is of the snap in type for association with an apertured support member.

4. An elongate one-piece spring-type fastener as set forth in claim 1, wherein said elongate blade-like members are spaced laterally.

5. An elongate one-piece spring-type fastener as set forth in claim 1 wherein the means for temporarily restraining said elongate members in panel disengaging relation includes interlocking means located on the inwardly facing surfaces of said elongate members.

6. An elongate one-piece spring-type fastener as set forth in claim 5 wherein said interlocking means includes a lug projecting laterally of one of said elongate members and means on the other elongate members for interlocking association with said lug.

7. An elongate one-piece spring-type fastener member as set forth in claim 5 wherein said interlocking means is located intermediate said head and the free extremities of said elongate members.

8. An elongate one-piece, spring-type fastener as set forth in claim 5 wherein said interlocking means has a recessed lug on one of said elongate members and a complementary lug on the other elongate member adapted to be lockingly accommodated by said recessed lug.

9. An elongate spring-type fastener including a head at one extremity for attachment to an apertured support, said head having a clamping surface for engaging one side of an apertured panel, a pair of elongate, blade-like members coupled at one extremity with said head section and relatively movable in scissors-like fashion with respect to each other, to permit telescopic association and disassociation thereof with respect to a complementary panel aperture, a pair of oppositely disposed shoulders on said members for clampingly engaging the opposite said of said apertured panel, and means for temporarily retaining said members in panel-disengaging relation whereby to facilitate telescopic association with and disassociation from a complementary panel aperture.

10. An elongate spring-type fastener as set forth in claim 9 wherein said head is sufficiently resilient to permit snap-in association thereof with an apertured support.

* * * * *